US007734403B2

(12) United States Patent
Baijens et al.

(10) Patent No.: US 7,734,403 B2
(45) Date of Patent: Jun. 8, 2010

(54) SYSTEM FOR VEHICLE DRIVER SUPPORT FOR STOPPING AND STARTING PROCEDURES

(75) Inventors: Mark Baijens, Offenbach (DE); Oliver Huth, Kronberg (DE); Markus Ohly, Lich-Eberstadt (DE); Thomas Meurers, Eschborm (DE); Patrick Wischer, Schwalbach a.Ts (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 256 days.

(21) Appl. No.: 10/593,731

(22) PCT Filed: Mar. 23, 2005

(86) PCT No.: PCT/EP2005/051329

§ 371 (c)(1),
(2), (4) Date: Aug. 14, 2008

(87) PCT Pub. No.: WO2005/090134

PCT Pub. Date: Sep. 29, 2005

(65) Prior Publication Data

US 2008/0294319 A1    Nov. 27, 2008

(30) Foreign Application Priority Data

Mar. 23, 2004   (DE) .................. 10 2004 014 175

(51) Int. Cl.
G06F 19/00 (2006.01)
(52) U.S. Cl. .................. 701/70; 701/29; 701/83; 340/903
(58) Field of Classification Search .................. 701/32, 701/29, 70, 79, 83, 110; 303/155; 340/903
See application file for complete search history.

(56) References Cited

U.S. PATENT DOCUMENTS

| 4,717,207 A | 1/1988 | Kubota et al. |
| 5,586,814 A * | 12/1996 | Steiner ..................... 303/116.2 |
| 2006/0097570 A1* | 5/2006 | Doerr et al. .................. 303/193 |

FOREIGN PATENT DOCUMENTS

| DE | 195 5 552 A1 | 1/1997 |
| DE | 198 49 799 A1 | 6/2000 |
| DE | 100 21 043 A1 | 11/2000 |
| DE | 199 31 345 A1 | 12/2000 |
| WO | WO 0010854 | 3/2000 |
| WO | WO 03043861 A1 | 3/2003 |

* cited by examiner

Primary Examiner—Gertrude Arthur Jeanglaud
(74) Attorney, Agent, or Firm—RatnerPrestia

(57) ABSTRACT

A system for vehicle driver support carrying out assist functions in a motor vehicle for supporting the driver in stopping and starting maneuvers, which are activated depending on a first comparison between at least one driving state parameter and a threshold value and/or based on first actuating signals from an actuating unit operable by the driver. A control unit determines a vehicle state by way of another comparison of at least one driving state variable with a predetermined threshold value and/or based on additional actuating signals of the actuating unit, in that the control unit checks whether at least one assist function is activated, and in that the control unit controls the brake system of the vehicle depending on the detected vehicle state when at least one assist function is activated.

18 Claims, 2 Drawing Sheets

SYSTEM FOR VEHICLE DRIVER SUPPORT FOR STOPPING AND STARTING PROCEDURES

This application is the U.S. national phase application of PCT International No. PCT/EP2005/051329, filed Mar. 23, 2005, which claims priority to German Patent Application No. DE 10 2004 014 175.4, filed Mar. 23, 2004.

BACKGROUND OF THE INVENTION

1. Technical Field

The present invention relates to a system for driver support carrying out assist functions in a motor vehicle for supporting the driver in stopping and starting maneuvers, which are activated depending on a first comparison between at least one driving state parameter and a threshold value and/or based on first actuating signals from an actuating means operable by the driver.

2. Description of Related Art

A large number of different electronic assist functions are known to support a driver of a motor vehicle in starting and stopping maneuvers. In order to prevent the vehicle from rolling rearwards during a starting maneuver, e.g. starting aids are employed where brake pressure is adjusted in the wheel brakes during standstill of the vehicle, which is automatically reduced during the starting maneuver. Customary names of starting aids of this type are hill holder system or Hill-Start-Assist-System (HAS System). Further, it is e.g. known to automatically activate an electric parking brake of the motor vehicle when it is detected that the vehicle is being parked, and to release the electric parking brake when a desire of the driver to start is detected.

The known assist functions are designed as independent functions which respectively include an own activation logic and a control of their own calculating the brake pressure demand. Thus, it is principally possible that several assist systems of this type are activated at the same time. As this occurs, there may be a multiple calculation of a brake pressure demand, with the result of an unnecessarily high expenditure in realizing the systems.

Especially the fact that in different assist systems normally different conditions for detecting driving situations such as a starting maneuver are checked, or that the existence of conditions is identified by way of difference threshold values, the different assist systems often calculate different pressure demands. Above all when there is a large number of assist systems of this type in a motor vehicle, the consequence may be an erroneous control of the brake system and, hence, impairment of vehicle safety.

SUMMARY OF THE INVENTION

In view of the above, an object of the invention involves realizing a reliable and safe control of the brake system also in the event that a large number of assist functions are performed in order to support the driver in stopping and starting maneuvers in a motor vehicle.

According to the invention, the system for driver support carrying out assist functions in a motor vehicle in order to support the driver in stopping and starting maneuvers, which are activated depending on a first comparison between at least one driving state parameter and a threshold value and/or based on first actuating signals from an actuating means operable by the driver is characterized in that a control unit determines a vehicle state by means of another comparison of at least one driving state variable with a predetermined threshold value and/or based on additional actuating signals of the actuating means, that the control unit checks whether at least one assist function is activated, and that the control unit controls the brake system of the vehicle depending on the detected vehicle state when at least one assist function is activated.

Advantageously, the invention uses a control unit, which performs both the detection of the vehicle states and the control of the brake system of the vehicle. The individual assist functions are maintained within the limits of the invention so that the vehicle driver can activate or deactivate the individual functions in order to set the degree of desired assistance according to his or her requirements.

Thus, a system is provided with a central control unit, i.e. being equal for all assist functions of the described type, which detects the vehicle states and performs the control of the brake system. However, brake interventions are carried out only if at least one of the assist functions is activated.

The invention uses the knowledge that the different assist functions in a defined vehicle state, such as the vehicle state 'hold', basically found on identical brake force demands which are determined by the central control unit in the system of the invention and are introduced into the brake system. Above all, however, the control unit allows a determination of transitions between different vehicle states being uniform for all assist functions, so that a uniform, reliable and safe control of the brake system is safeguarded when performing the assist functions.

In a favorable embodiment of the invention, it is arranged that the vehicle state is determined depending on a comparison between the vehicle speed and/or the vehicle acceleration with a threshold value.

In another favorable embodiment of the invention, the vehicle state is detected depending on an actuating signal of a brake actuating means operable by the driver and/or a driving engine control means.

Preferably, the actuating signals are detected by sensors mounted at the actuating means.

An assist function is advantageously activated depending on an actuating signal of a brake actuating means operable by the vehicle driver and/or a driving engine control means or depending on an actuating signal of an activation means operable by the driver.

The activation means may e.g. concern a switch for activation of a defined assist function, which switch is operable by the vehicle driver.

In a particularly favorable embodiment of the invention, the control unit is configured as a state machine. It is preferably provided in this case that a vehicle state is detected by examining in another vehicle state whether there is a transition condition for a state transition, and a state transition takes place when the transition condition is satisfied.

Preferably, the existence of a transition condition is detected by way of the additional comparison between at least one vehicle state variable and a predetermined threshold value and/or by way of the additional actuating signals of an actuating means operable by the driver.

In an especially favorable embodiment of the invention, exactly one vehicle state is established which is selected from one of the following vehicle states: creep, stop, hold stationary, park/secure, start up.

In a suitable embodiment of the invention, the control unit controls or regulates the brake system of the vehicle depending on the activated assist function.

This is favorable above all when different control/regulating demands would result with respect to different assist functions that can be activated in a defined vehicle state.

Preferably, the system comprises an arbitration unit, which detects depending on which activated assist function the control unit controls the brake system when several assist functions are activated in a vehicle state.

This is favorable when several assist functions are activated in a vehicle state, which have as a result different control/regulating demands.

Advantageously, the brake force is increased in the vehicle state 'stop', and the rate of change of the brake force is defined depending on the activated assist function and/or the assist function determined by the arbitration unit.

It is then provided in suitable embodiments of the invention that brake pressure is built up in a service brake system and/or a parking brake system is activated in the vehicle state 'stop' in order to increase the brake force.

Preferably, the brake force is maintained or a predetermined brake force is adjusted in the vehicle state 'hold'.

In a favorable embodiment of the invention, the brake force which must be built up in the vehicle state 'hold' is defined depending on a longitudinal inclination angle of the vehicle.

It is further preferred that the brake force is reduced in the vehicle state 'start up'.

In a favorable embodiment of the invention, in the vehicle state 'uphill starting' the brake force is reduced depending on a result of a comparison between a downhill force and a driving power of the vehicle.

Preferably, the parking brake is activated in the vehicle state 'park/secure'.

In another preferred embodiment of the invention, it is arranged that at least one of the following assist functions is performed: a function for the active stop and start-up, a dynamic brake function, a function for the active vehicle hold, a traffic jam assist function, a function for the automatic release of the parking brake in a start-up maneuver, and a hill start assist system.

BRIEF DESCRIPTION OF THE DRAWINGS

Further advantages, special features, and suitable improvements of the invention can be seen in the written description and the subsequent illustration of preferred embodiments, making reference to the Figures.

In the drawings.

DETAILED DESCRIPTION OF THE PREFERRED EMBODIMENTS

Figure 1:
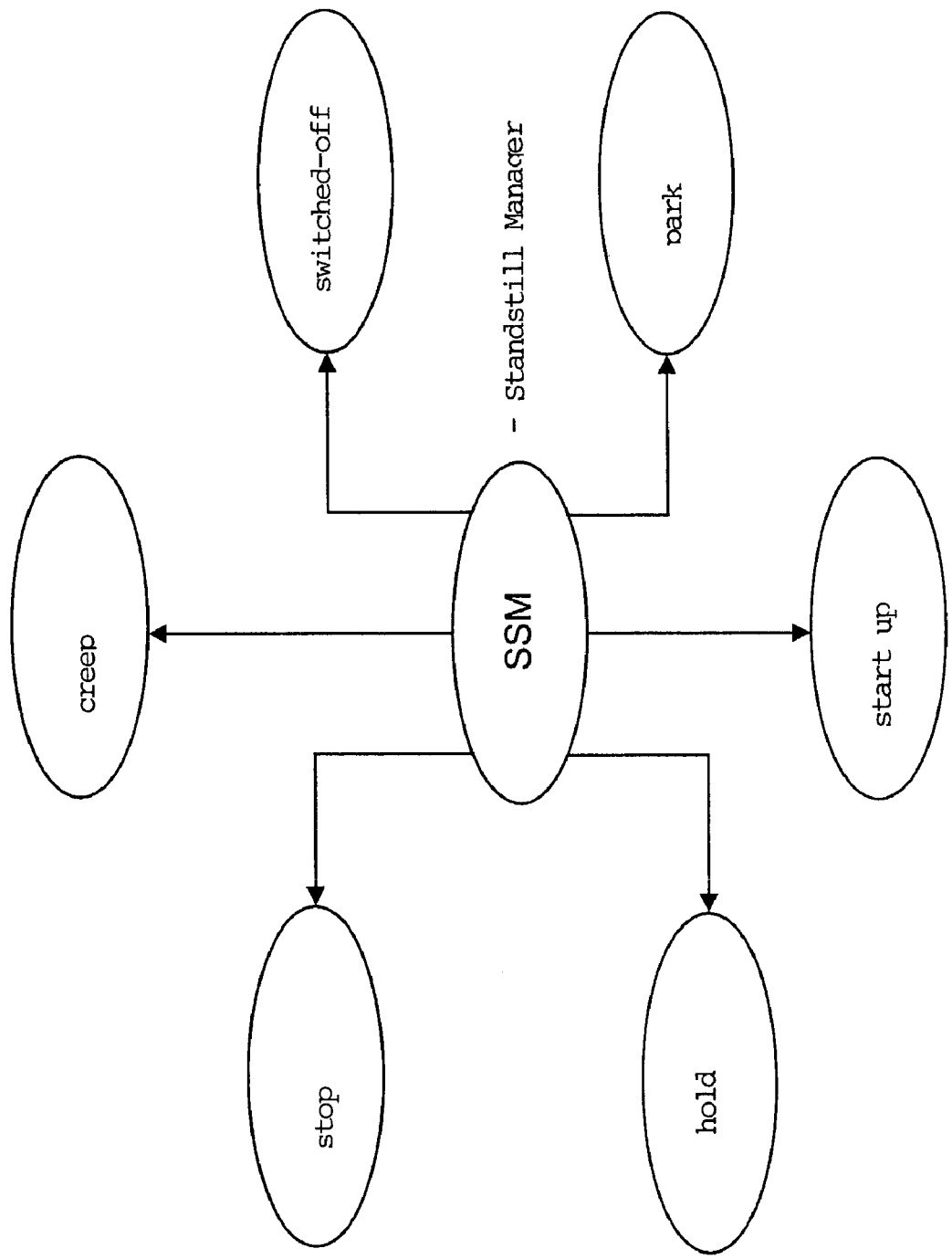
FIG. 1 shows a survey of the vehicle states which are distinguished in a preferred embodiment of the invention.

A preferred embodiment of the system of the invention for the driver support is referred to as standstill manager (SSM) in the following. The SSM controls the brake system of the vehicle, which preferably comprises a service brake system and an electric parking brake.

The service brake system of the motor vehicle e.g. concerns a hydraulic or electrohydraulic brake system, in which brake pressure is built up in a hydraulic fluid in a master brake cylinder and is transmitted to wheel brake cylinders being arranged at the wheels of the vehicle.

Favorably, the service brake system also includes an energy supply that is controllably by the SSM and permits building up the brake pressure in the master brake cylinder or in the wheel brake cylinders, respectively.

The wheel brake cylinders further connect to the master brake cylinder by way of separating valves controllable by the SSM so that the brake pressure in the wheel brake cylinders can be preserved by closing of the valves. Alternatively, the brake pressure can also be maintained by an active booster.

The vehicle driver controls the service brake system using a brake actuating means, which is usually designed as a pedal, which is mechanically coupled to the master brake cylinder by way of a brake booster or, in the case of an electrohydraulic brake system, is equipped with a pedal travel sensor, whose signals are detected by a control unit and serve to control a hydraulic unit. The brake pressure in the wheel brake cylinders is measured by means of pressure sensors.

However, the invention is not limited to this embodiment of the service brake system. The expert in the art rather notices that the invention can be transferred in a similar manner also to other brake systems.

The electric parking brake comprises, for example, duo servo or combined-caliper wheel brakes being arrested by actuators. The actuators are actuated directly at the brake caliper either by means of an electric motor via Bowden cables or by means of appropriate mechanics or hydraulics. The vehicle driver controls the electric parking brake preferably by means of a switch, which is arranged inside the motor vehicle. Besides, the motor vehicle is equipped with a driving engine, e.g. designed as an internal combustion engine, which generates an engine torque being transmitted to the drive wheels via the driving track of the vehicle. The engine is controlled by the vehicle driver using an accelerator pedal, which is preferably equipped with a pedal travel sensor.

The driving track especially comprises a gear, which connects to the driving engine by way of a clutch or, in the case of an automatic transmission, by way of a torque converter. The clutch is operated by the vehicle driver using a clutch pedal, which is preferably likewise equipped with a pedal travel sensor. In addition, the gear, or an actuating means shifting the gears, is equipped with a sensor for detecting the gear engaged.

To determine the vehicle speed v, a wheel speed sensor is arranged on at least one wheel of the vehicle. Additional sensors of the motor vehicle can be used to e.g. find out whether the driver seat is occupied and whether the driver door is open or closed.

Several assist functions are provided in order to support the driver in handling the vehicle in the bottom speed range, preferably at vehicle speeds v lower than 4 km/h. In a favorable embodiment of the vehicle, the following assist functions are concerned which will be explained in detail hereinbelow:

A function for supporting the vehicle driver when stopping and starting to drive (Stop % Go, S&G), e.g. in a traffic jam.

A dynamic brake function (Dynamic Brake Function, DBF) in which slowing down of the vehicle is assisted by means of the service brake by an additional intervention of the parking brake close to standstill.

A function for the active vehicle hold (Active Vehicle Hold, AVH), which prevents the vehicle from unwanted roll away.

A traffic jam assist system, which supports the driver likewise in stopping and starting to drive in a traffic jam.

A function for the automatic release of the electric parking brake in a starting maneuver (Drive Away Release, DAR).

A starting aid (Hill Start Assist, HAS) which prevents the vehicle from rolling rearwards in a starting maneuver.

It is arranged for by the invention that the existing assist functions or one or more control devices intended for this purpose check whether conditions for the activation or deactivation prevail. The activation of the functions takes place when a predefined vehicle state prevails, and/or when an actuating signal of an actuating means operated by the driver exists. The actuating means may e.g. relate to the brake actuating means, the driving engine control means, an activation switch of the electric parking brake, or a switch for the activation of the assist function.

The S&G function is used to slow the vehicle down by way of pressure buildup in the wheel brakes, when the vehicle driver releases the accelerator pedal, i.e. does not demand engine torque, at low vehicle speeds v, for example, when driving in a queue in traffic jams. Preferably, the brake pressure is reduced when a predefined vehicle speed v is reached, which is subsequently maintained.

Similarly, the SA function supports the driver by slowing the vehicle down until standstill by way of pressure buildup in the wheel brake when the desire of the driver to hold is recognized. This is preferably done in that it is detected at a low vehicle speed v that the driver no longer applies the accelerator pedal.

The S&G function as well as the SA function are activated and deactivated by the driver using a switch in an embodiment of the invention. However, it can also be provided in other embodiments of the invention that one of the two functions is automatically activated when the vehicle speed lies in a predetermined range during a predefined time span and that the S&G function is deactivated when a predefined vehicle speed is exceeded, or when standstill of the vehicle is detected.

The vehicle is stopped by the dynamic brake function (DBF) especially in an emergency stop situation. As this occurs, the vehicle is initially slowed down by means of the hydraulic service brake until a vehicle speed v of e.g. 4 km/h is reached. Automatic slowing down is ensured by means of the electric parking brake at lower speeds. The dynamic brake function is activated by means of a switch to be actuated by the vehicle driver and, thus, allows especially slowing down of the vehicle when the brake actuating means cannot be operated by the vehicle driver. The function is deactivated when standstill of the vehicle is detected.

The Active Vehicle Hold function secures the vehicle against unwanted rolling by building up brake pressure in the wheel brakes during standstill. The function is activated by the vehicle driver, preferably by means of a switch. Automatic activation is also feasible. If the driver leaves the vehicle, which is detected by means of a sensor at the driver's door preferably when the driver's door is opened, or if a predefined period has expired, there is preferably a switch-over from the hydraulic service brake to the electric parking brake. This function is preferably deactivated when the driver's desire to start to drive is detected, or when deactivation by the driver is carried out by means of the switch.

The Drive Away Release function is used in a starting maneuver to automatically release the electric parking brake of the vehicle that was activated during standstill. The electric parking brake is released in particular when a driver's desire to drive away is identified. The Drive Away Release function is then activated when standstill of the vehicle is detected and when the driver has activated the electric parking brake.

In a similar manner, the driver is supported during startup by the Hill Start Assist function because brake pressure is built up in the wheel brakes of the vehicle, which is being reduced or canceled when a desire to start is detected. The Hill Start Assist function either is activated by the vehicle driver, e.g. by means of a corresponding switch, or an automatic activation takes place when the driver applies the service brake and the vehicle is driving at a hill. Deactivation takes place preferably when the startup of the vehicle has been detected, or when a condition to terminate is satisfied. A termination condition may be e.g. an activation of the electric parking brake, or pulling of the handbrake, respectively. Besides, the function is favorably deactivated when it is not detected by means of a seat occupancy sensor at the driver's seat that the driver's seat is taken.

The Standstill Manager executes the control of the brake system, i.e. performing the assist functions, according to the invention. In a favorable embodiment of the invention, the Standstill Manager is designed as a state machine. The vehicle states, which are identified by the Standstill Manager, are illustrated in FIG. 1 and comprise the states of creeping, starting, holding, riding, and parking/securing. Besides, a state 'switched off' is provided in which the Standstill Manager is disabled.

The Standstill Manager is activated when the vehicle speed v falls under a predefined threshold value, e.g. 4 km/h. The Standstill Manager is deactivated for values of the vehicle speed v above the predetermined threshold value, i.e. it adopts the state 'switched off'. Deactivation favorably also takes place when none of the vehicle's assist functions are activated. Besides, deactivation favorably also takes place when a defect is detected, for example, in the brake system or in vehicle sensors used by the Standstill Manager.

Figure 2:
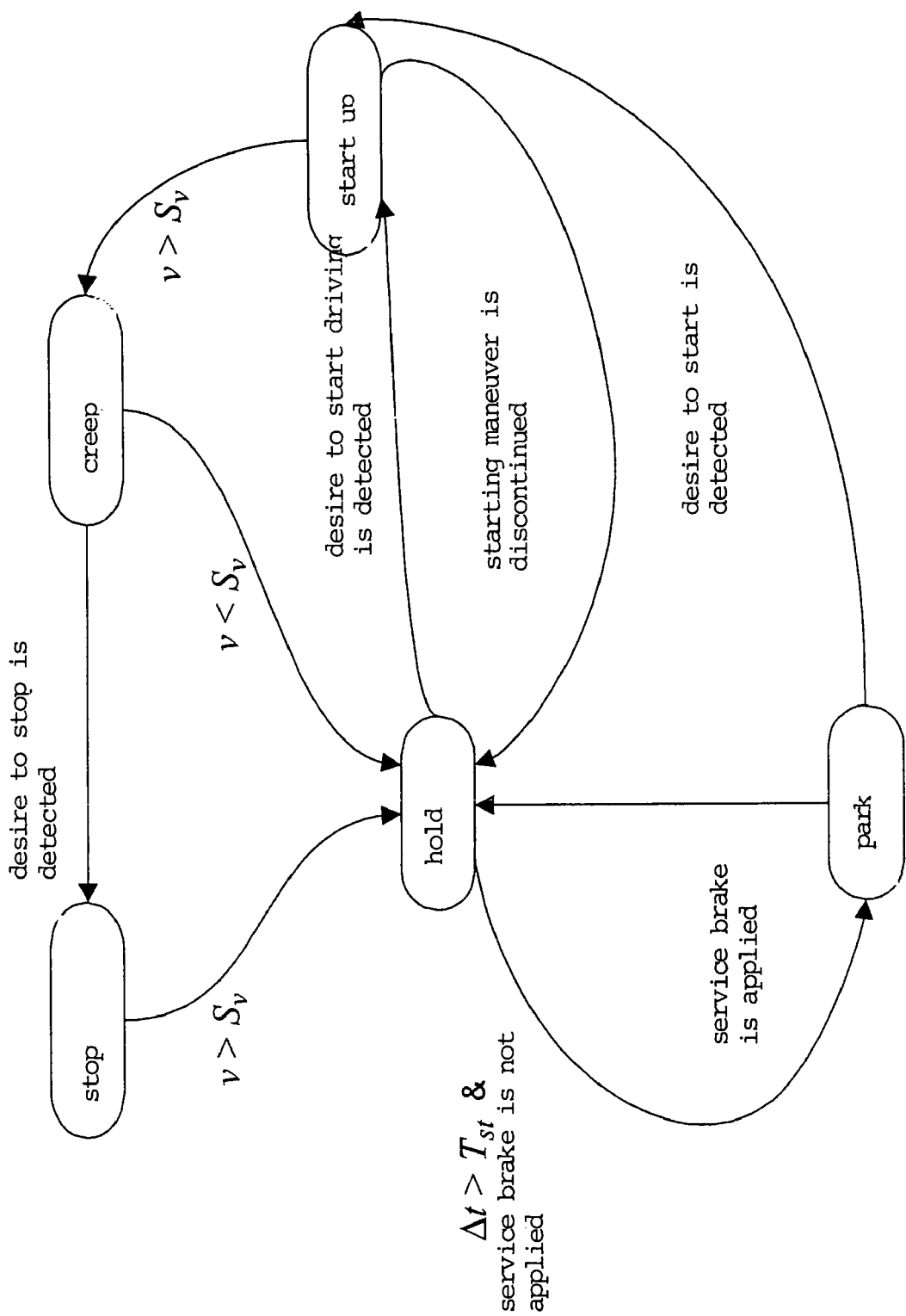
FIG. 2 is a state diagram in which especially possible transitions between the vehicle states illustrated in FIG. 1 are shown.

The detection of the other states appears from the conditions initiating a state transition of the Standstill Manager, which is also referred to as Transition. The possible Transitions are depicted in FIG. 2.

Starting from the state 'stop', there are two possible Transitions. One Transition into the state 'hold' occurs when standstill of the vehicle is identified. Due to the usually limited resolution ability of the speed sensors or wheel rotational speed sensors used in vehicles, standstill is preferably identified in the practice when the vehicle speed v drops below a predetermined threshold value $S_{v1}$, for example 1 km/h. The Transition into the state 'switched off' occurs when none of the assist functions are activated or when the Standstill Manager is deactivated due to a defect.

Based on the state 'hold', there are three possible Transitions in a preferred embodiment of the invention. One Transition into the state 'start-up' occurs when a driver's desire to start driving is detected. In a favorable embodiment of the invention, this takes place e.g. when the accelerator pedal has been applied during a predefined time of e.g. roughly 100 ms or when the accelerator pedal has been applied at least by a predetermined pedal travel of e.g. 3% of the maximum pedal travel. The application of the accelerator pedal is determined by means of the pedal travel sensor at the accelerator pedal.

It may likewise be provided to check, instead of monitoring the accelerator pedal or in addition thereto, whether an engine torque prevails which is of a rate sufficient to allow start-up of the vehicle, and/or whether the clutch will be closed. As this occurs, the state of the clutch may be determined by means of a pedal travel sensor at the clutch pedal, and the control unit of the engine generally provides the value of the engine torque of the driving engine.

Further conditions for the Transition into the state 'start-up' are satisfied when a gear in the vehicle transmission is selected, what is found out using a sensor at the transmission or at the gearshift mechanism of the vehicle, and when the actuating means of the service brake is not actuated by the driver.

In another method that can be used herein, engagement of the clutch is detected when the driving torque lies in a predetermined range, i.e. especially is higher than a predetermined threshold value, and the rate of change of the engine rotational speed does not reach a predetermined threshold value. This method is advantageous in that for detecting the engagement of the clutch, or the start up, respectively, exclusively signals are used which are provided by the engine control, there being no need for additional sensors. In addition, likewise methods which can be used to detect start-up or engagement of the clutch are described in German publication DE 100 63 061 A1.

A transition from the state 'hold' to the state 'park/secure' preferably takes place when the period $\Delta t_{sr}$, in which the vehicle is at standstill, exceeds a predefined threshold value $T_{sr}$, and when the driver does not actuate the actuating means of the service brake. Further, the transition into the state 'hold' can occur when the driver leaves the vehicle, and leaving the vehicle, as described hereinabove, is detected by means of a sensor at the driver's door when the driver's door is opened.

A transition into the state 'switched-off' occurs due to the conditions, which have been described hereinabove.

Based on the state 'start-up', preferably three possible Transitions of the Standstill Manager are provided. If the starting maneuver is stopped, which is preferably detected by means of the accelerator pedal sensor because the driver releases or no longer applies the accelerator pedal, a transition into the state 'hold' occurs. A transition into the state 'creep' occurs when the vehicle speed v exceeds a threshold value which preferably corresponds to the threshold value $S_v$.

Besides, a transition into the state 'switched off' can prevail when one of the conditions prevail, which have already been described in this regard.

Based on the state 'creep', there are favorably also three possible Transitions. In addition to the Transition into the state 'switched off', which occurs in the presence of the above-mentioned condition, especially a Transition into the state 'stop' is provided when a desire of the driver to stop is detected. This may e.g. be the case when the accelerator pedal sensor finds out that the driver has released the accelerator pedal completely.

Further, a transition into the state 'hold' takes place when the vehicle speed v drops below the threshold value $S_v$. Based on the state 'park/secure in position', into which the Standstill Manager can pass from the state 'hold', there are three possible Transitions in a favorable embodiment of the invention. A Transition into the state 'start-up' occurs when the conditions are satisfied which also lead to a transition of the Standstill Manager from the state 'hold' into the state 'start-up'. Further, a transition from the state 'park' into the state 'hold' can be provided which takes place when the driver actuates the actuating means of the service brake. In further embodiments of the invention, it may likewise be arranged that a Transition into the state 'hold' occurs, when a seat occupancy sensor finds out that the driver re-assumes his seat after an absence. Further, a transition into the state 'switched off' is provided when the conditions that have been described already prevail.

The Standstill Manager determines the activated assist functions in every state of the Standstill Manager, which corresponds to a corresponding state of the vehicle. The brake system is controlled by the Standstill Manager depending on the assist function or the assist functions that are activated.

In the state 'stop', both the traffic-jam assist function and the Dynamic Brake Function can be activated. As the traffic jam assist function causes a comfortable slowing down of the vehicle into standstill, and the Dynamic Brake Function shall bring about a quick slowing down of the vehicle in an emergency situation, the brake system is controlled by the Standstill Manager depending on the function that is activated in the respective state.

If the Dynamic Brake Function is activated, while the Standstill Manager adopts the state 'stop', pressure is built up in the hydraulic service brake, preferably with a high pressure increase gradient of e.g. 100 bar/s approximately. In a possible embodiment of the invention, the electric parking brake may be activated in addition. This shortens the stopping distance of the vehicle still further.

If the traffic-jam assist function is activated, while the Standstill Manager has adopted the state 'stop', pressure builds up in the hydraulic service brake with a low pressure-increase gradient of e.g. 30 bar/s approximately. This ensures a comfortable slowing down of the vehicle, avoiding in particular a pitching motion of the vehicle when stopped.

As likewise both of the above-mentioned assist functions can be activated, it is arranged to integrate a primary arbitration unit into the system, which detects which demand the Standstill Manager puts into practice, i.e. depending on which of the assist functions the brake system is controlled. It is preferably provided that the demands of the Dynamic Brake Function have priority over the demands of the traffic jam assist function so that a quick deceleration of the vehicle is safeguarded when the Dynamic Brake Function is active.

In the event of transition of the Standstill Manager into the state 'hold', initially a possibly prevailing pressure increase gradient is reduced until zero so that a pitching motion of the vehicle in the transition to standstill is avoided. Besides, the electric parking brake is released, if it had been activated in a previous state.

After the reduction of a possibly prevailing pressure increase gradient to zero and the release of the electric parking brake, it is provided in an embodiment of the invention to maintain the brake pressure prevailing in the service brake. This is done by closing the separating valves between the master brake cylinder and the wheel brake cylinders. Also, standstill of the vehicle is monitored using the measuring signals of the wheel speed sensors. If roll away of the vehicle is detected, the brake pressure in the service brake is increased by a predetermined amount by way of actuating the energy supply of the brake system.

In another embodiment of the invention, it may be arranged to reduce the brake pressure in the service brake in the state 'hold' until roll-away of the vehicle is detected, and to then increase the brake pressure by a predetermined amount. It is hereby prevented that excessive brake pressure prevails in the wheels brakes during standstill, which would impair the traction of the vehicle in a subsequent starting maneuver.

It may likewise be provided that the brake pressure adjusted in the state 'hold' by the Standstill Manager is calculated by way of the angle of longitudinal inclination of the vehicle, which is detected using an inclination angle sensor or a longitudinal acceleration sensor. The sensor measures the sum of the change of rate of the vehicle speed v and the downhill acceleration so that, with the change of rate of the vehicle speed v being known that can e.g. by determined by way of the measuring signals of the wheel speed sensors, the downhill acceleration and, based thereon, the angle of slope or the angle of longitudinal inclination of the vehicle can be determined. During standstill of the vehicle, especially $$\sin(\alpha) = -a_{Sensor}/g$$

applies, where $\alpha$ refers to the angle of longitudinal inclination of the vehicle, $a_{Sensor}$ refers to the signal of the longitudinal acceleration sensor, and g designates the acceleration due to gravity. The sign is chosen in such a fashion that a positive angle α is obtained, when the vehicle is placed in the uphill direction, while a negative angle α is obtained, when the vehicle is placed in the downhill direction.

When the Standstill Manager adopts the state 'start-up', while at least one of the available assist functions is activated, the brake pressure in the hydraulic service brake is reduced with a predetermined brake pressure gradient, and the electric parking brake, if activated, initially will be released in part and will be released completely thereafter.

It is arranged in a favorable embodiment of the invention that the Standstill Manager determines the brake pressure gradient for the brake pressure reduction depending on the angle of longitudinal inclination of the vehicle and the starting direction, which can be determined by way of the gear applied. Favorably, a higher brake pressure gradient is adjusted when starting to drive in downhill direction as compared to starting to drive in the plane.

When starting to drive in uphill direction, the brake pressure in the service brake in a favorable embodiment of the invention is reduced to the extent that the driving torque provided by the driving engine of the vehicle rises. As this occurs, the downhill force and the driving power that results from the engine torque provided by the driving engine are compared in a balance of forces. The brake pressure adjusted by the Standstill Manager is then calculated in such a fashion that the brake force compensates the difference between the downhill force and the driving power. If the driving power equals the downhill force or is higher than the latter, the brake pressure in the service brake will be reduced to zero.

After a Transition of the Standstill Manager into the state 'park/secure', the electric parking brake will be activated. The maximum brake torque of the electric parking brake is adjusted then so that standstill of the vehicle is safeguarded even if the grade changes during standstill, as can occur e.g. in Duplex garages.

The state 'creep' in which only the Stop & Go function can be active, is a passive state of the Standstill Manager, that means, brake force demands are not determined in this case. Hence, the state renders it possible also in the bottom speed range, in which the Standstill Manager is activated, that the driver controls the vehicle and especially the brake system independently, i.e. without the support of an assist system. The driver thus exclusively controls the brake force demands and the traction torque demands in the state 'creep'.

The Standstill Manager examines in the state 'switched off' whether brake pressure prevails in the service brake of the vehicle. If this is the case, pressure is reduced with a predetermined brake pressure gradient.

The invention claimed is:

1. System for driver support carrying out assist functions in a motor vehicle for supporting a driver of the motor vehicle in stopping and starting maneuvers, the assist functions being activated depending on: a first comparison between at least one driving state variable and a first threshold value; at least one first actuating signal from an actuating means operable by the driver; or a combination thereof, the system comprising:
    a control unit configured to:
    determine a vehicle state by means of: a second comparison between at least one driving state variable with a second threshold value; at least one second actuating signal from the actuating means operable by the driver; or a combination thereof;
    check whether at least one assist function is activated; and
    control a brake system of the motor vehicle depending on a determined vehicle state when the at least one assist function is activated.

2. System as claimed in claim 1, wherein the second comparison is between a speed of the motor vehicle or an acceleration of the motor vehicle with the second threshold value.

3. System as claimed in claim 2, wherein both the speed of the motor vehicle and the acceleration of the motor vehicle are compared with a threshold value.

4. System as claimed in claim 1, wherein the vehicle state is detected depending on at least one actuating signal of a brake actuating means operable by the driver of the motor vehicle or a driving engine control means.

5. System as claimed in claim 4, wherein the vehicle state is detected depending on the at least one brake actuating signal of the brake actuating means operable by the driver of the motor vehicle and an actuating signal of the driving engine control means.

6. System as claimed in claim 1, wherein the at least one assist function is activated depending on at least one actuating signal of a brake actuating means operable by the driver of the motor vehicle or a driving engine control means.

7. System as claimed in claim 1, wherein the vehicle state is detected by examining a different vehicle state to determine whether there is a transition condition for a state transition, and wherein the state transition takes place when the transition condition is satisfied.

8. System as claimed in claim 7, wherein the transition condition is detected by way of a third comparison between at least one vehicle state variable and a third threshold value; by way of at least one third actuating signal of the actuating means operable by the driver of the motor vehicle; or a combination thereof.

9. System as claimed in claim 1, wherein the vehicle state is selected from the group consisting of creep, stop, hold, park, secure, and start up.

10. System as claimed in claim 9, wherein a brake force is increased in the vehicle state 'stop', and wherein a rate of change of the brake force is determined depending on the at least one assist function that is activated.

11. System as claimed in claim 10, wherein a brake pressure is built up in a service brake system or a parking brake system is activated in the vehicle state 'stop' in order to increase the brake force.

12. System as claimed in claim 10, wherein the brake force is maintained or a predetermined brake torque is built up in the vehicle state 'hold'.

13. System as claimed in claim 10, wherein the brake force which must be built up in the vehicle state 'hold' is defined depending on a longitudinal inclination angle of the motor vehicle.

14. System as claimed in claim 10, wherein the brake force is reduced in the vehicle state 'start-up'.

15. System as claimed in claim 10, wherein, in the vehicle state 'start-up', the brake force is reduced depending on a result of a fourth comparison between a downhill force and a driving power of the motor vehicle.

16. System as claimed in claim 9, wherein a parking brake is activated in the vehicle state 'park'.

17. System as claimed in claim 1, wherein the at least one assist function is selected from the group consisting of a function for active stop and go, a dynamic brake function, a function for active vehicle hold, a traffic-jam assist function, a function for automatic release of an electric parking brake in a start-up maneuver and a starting assist system.

18. A process for driver support carrying out assist functions in a motor vehicle for supporting a driver of the motor vehicle in stopping and starting maneuvers, which are activated depending on a first comparison between at least one driving state variable and a first threshold value or based on at least one first actuating signal from an actuating means operable by the driver, comprising:

determining a vehicle state by means of a second comparison of at least one driving state variable with a second threshold value or based on at least one second actuating signal from an actuating means operable by the driver;

checking whether at least one assist function is activated; and controlling a brake system of the motor vehicle depending on a vehicle state when the at least one assist function is activated.

\* \* \* \* \*